United States Patent
Ferguson

(10) Patent No.: US 10,949,476 B1
(45) Date of Patent: *Mar. 16, 2021

(54) SYSTEMS AND METHODS FOR GENERATING WEB PAGES FOR DATABASE SEARCH AND SEARCH ENGINE OPTIMIZATION

(71) Applicant: CarMax Business Services, LLC, Richmond, VA (US)

(72) Inventor: Chris Ferguson, Midlothian, VA (US)

(73) Assignee: CARMAX BUSINESS SERVICES, LLC, Richmond, VA (US)

( * ) Notice: Subject to any disclaimer, the term of this patent is extended or adjusted under 35 U.S.C. 154(b) by 289 days.

This patent is subject to a terminal disclaimer.

(21) Appl. No.: 16/051,088

(22) Filed: Jul. 31, 2018

Related U.S. Application Data

(63) Continuation of application No. 15/789,692, filed on Oct. 20, 2017, now Pat. No. 10,068,021.

(51) Int. Cl.
   *G06F 17/00* (2019.01)
   *G06F 16/951* (2019.01)
   *G06F 16/16* (2019.01)

(52) U.S. Cl.
   CPC .......... *G06F 16/951* (2019.01); *G06F 16/164* (2019.01)

(58) Field of Classification Search
   CPC .............................. G06F 16/951; G06F 16/164
   See application file for complete search history.

(56) References Cited

U.S. PATENT DOCUMENTS

| 7,725,452 | B1 | 5/2010 | Randall |
| 8,645,367 | B1 | 2/2014 | Hajaj et al. |
| 8,868,540 | B2 * | 10/2014 | Ture .................. G06F 16/3322 707/709 |
| 10,068,021 | B1 * | 9/2018 | Ferguson .............. G06F 16/164 |
| 2012/0130983 | A1 | 5/2012 | Ryan et al. |

(Continued)

OTHER PUBLICATIONS

Min-Yen Kan and Hoang Oanh Nguyen Thi, Fast Webpage Classification using URL features. In Proceedings of the 14th ACM International Conference on Information and Knowledge Management (CIKM '05). Association for Computing Machinery, pp. 325-326, Oct. 2005.*

*Primary Examiner* — Greta L Robinson
(74) *Attorney, Agent, or Firm* — Troutman Pepper Hamilton Sanders LLP; Christopher J. Forstner; Scott A. Bergeson

(57) ABSTRACT

Examples relate to systems and methods for dynamically generating web pages for displaying database items based on metadata included in network URL requests. Some examples disclosed herein may enable receiving a URL comprising a plurality of segments, comparing each segment of the plurality of segments to known segment values, identifying, based on the comparison, searchable segments and one or more searchable categories for the searchable segments, independent of the order of the searchable segments within the URL, determining a search pattern based on the searchable segments and searchable segment categories, performing an inventory search based on the search pattern to return a list one or more inventory items, building web page metadata items based on the search pattern, and generating a web page comprising the web page metadata items and the list of inventory items.

20 Claims, 6 Drawing Sheets

(56) References Cited

U.S. PATENT DOCUMENTS

| | | |
|---|---|---|
| 2012/0180073 A1 | 7/2012 | Hung |
| 2013/0226898 A1 | 8/2013 | Brawer et al. |
| 2015/0350717 A1 | 12/2015 | Pantos et al. |
| 2017/0046763 A1 | 2/2017 | Pan et al. |
| 2017/0177727 A1 | 6/2017 | Scoda et al. |

* cited by examiner

SYSTEMS AND METHODS FOR GENERATING WEB PAGES FOR DATABASE SEARCH AND SEARCH ENGINE OPTIMIZATION

CROSS-REFERENCE TO RELATED APPLICATION

This application is a continuation of U.S. application Ser. No. 15/789,692, now allowed, entitled "Systems and Methods for Generating Web Pages for Database Search and Search Engine Optimization" and filed Oct. 20, 2017, which is hereby incorporated by reference.

FIELD OF INVENTION

The present disclosure relates to systems and methods for dynamically generating web pages. Specifically, systems and methods for dynamically generating web pages for displaying database items based on network URL requests, such web pages having associated metadata usable to global search engines.

BACKGROUND

Searchable websites provide a means for web browser users to access database items that fit the user's search criteria. For example, searchable websites often provide a variety of filters that allow a user to narrow her search for a database item (e.g., an item for sale) by matching available database items to the search criteria selected by the user. Each selection of a filter or multiple filters will lead to a different result set of available database items for display to the user. The resulting web pages displayed to the user often have a unique web page address within the searchable website as represented by its Uniform Resource Locator (URL). Searchable websites often comprise a collection of web pages each having a unique URL, wherein each web page represents different combinations of search criteria. Such websites employ a URL pattern that requires filter search criteria to be represented in a pre-determined hierarchy and using fixed terms to display a web page that shows available database items matching the user's selected search criteria. This requires the websites to create numerous URLs to be individually assigned to all conceivable combination of search criteria.

Since many web browser users begin their search for database items via global search engine websites (e.g. Google, Yahoo!, Bing, MSN, etc.), web pages within searchable websites may be designed according to search engine optimization (SEO) initiatives with the intention of increasing the likelihood that a user will navigate to the web pages via a global search engine web site.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, explain the principles of the disclosed technology. In the drawings.

DETAILED DESCRIPTION

Figure 1:
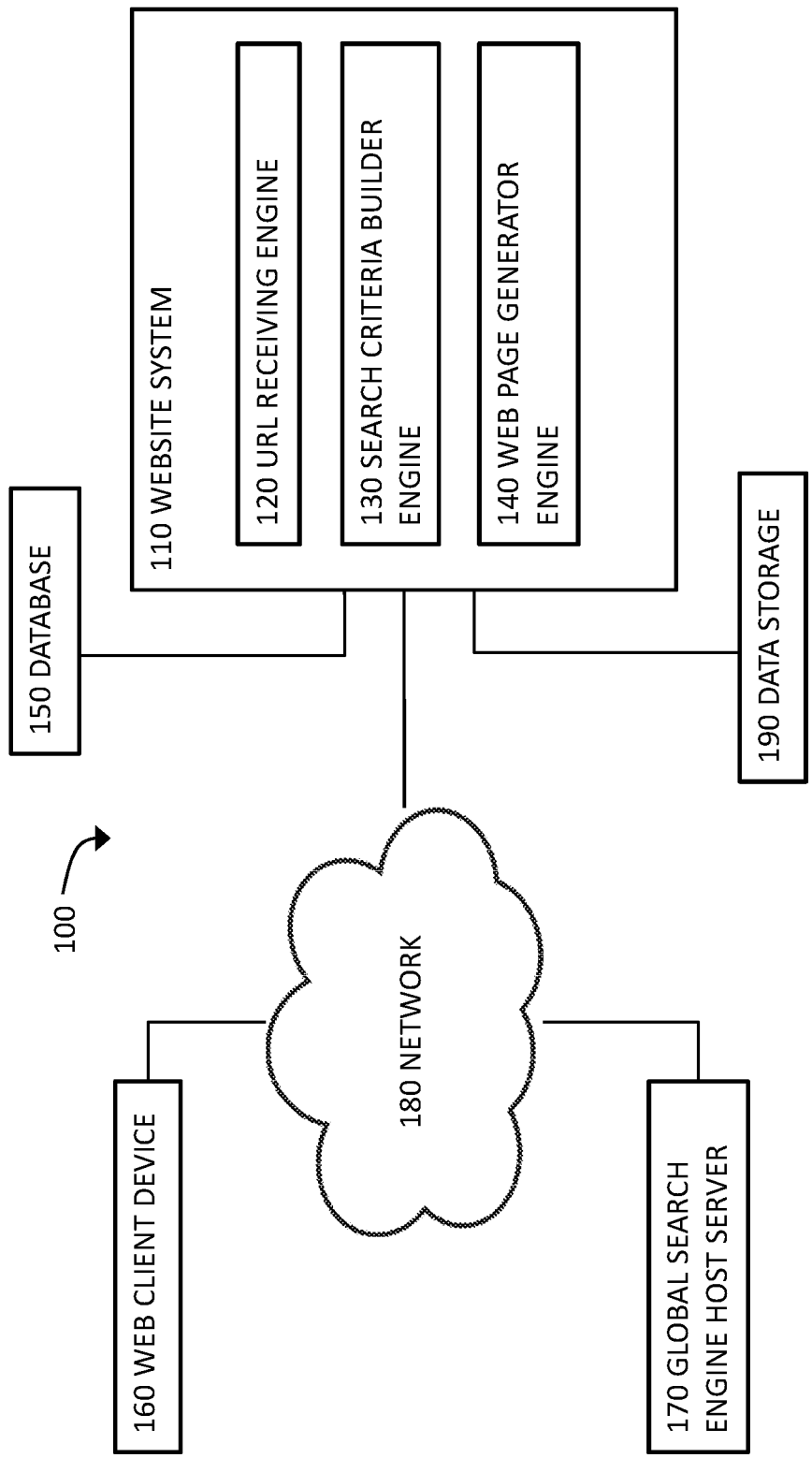
FIG. 1 is a block diagram depicting an example environment in which various website systems may be implemented, the block diagram also including a block diagram depicting an example website system to receive a URL and dynamically generate a web page.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Searchable websites often use a structure of web pages within the website that allows web browser users to access database items that fit the user's search criteria. Since many web browser users begin their search for database items via global search engine websites (e.g. Google, Yahoo!, Bing, MSN, etc.), web pages within searchable websites may be designed according to search engine optimization (SEO) initiatives with the intention of increasing the likelihood that a user will navigate to web pages within the searchable website via the global search engine websites. Searchable websites may have a structured Uniform Resource Locator (URL) pattern that represents the user's search, wherein each URL in the pattern corresponds to a web page that includes instructions for displaying the user's search intent (e.g. database items meeting the user's search criteria) and metadata items designed according to SEO initiatives. The URL pattern, when successfully designed, may include a plurality of canonical URLs that are unique URLs representing unique web pages for displaying possible user search criteria combinations, and the web pages within the URL pattern may contain interrelated metadata items to facilitate crawling and indexing by global search engines.

The URL pattern, once deployed, represents a static, pre-determined set of search criteria options (e.g. categories for classifying database items) and combinations (e.g. a specific combination of searchable features of database items). As such, it may be time consuming and challenging to update or modify an established URL pattern or to add search criteria options or search combinations to the website. Further, a URL pattern may not fully capture every possible set of search criteria options and combinations that may be input by a user into a global search engine website. As a result, a user that inputs unanticipated search criteria (i.e. search criteria that is not captured by the URL pattern) into a global search engine website may be less likely to navigate to a web page in the searchable website.

Examples disclosed herein provide technical solutions to such challenges by dynamically generating web pages for displaying a list of database items that correspond to the user's search intent based on a received URL without requiring that the URL represent a predetermined set of search criteria options or combinations, or pre-determined URL structure patterns. Examples disclosed herein provide technical solutions that allow for the process of analyzing a received URL to determine database items matching search intent to be handled apart from the generation of web page results to display those results in a manner that reflects the search intent. A generated web page may include instructions for displaying a list of database items that correspond to the user's search intent, metadata items designed according to SEO initiatives, or both.

According to some embodiments, the process for finding database items meeting the user's search intent is separated from the process of generating a web page that is optimized for global search engine crawling and indexing. By separating the process, it is possible to create web pages having logical URL structures that correspond to keywords provided by a user in a global search engine request without pre-determining all possible combinations of keywords that a user might input into a global search engine and without pre-building web pages and URLs corresponding to all possible combinations of keywords.

Examples disclosed herein may receive a URL, parse the URL, determine search criteria for searching items in a database based on the parsing, and generate a web page based on the determined search criteria.

Examples disclosed herein may enable receiving a URL comprising a plurality of segments, comparing each segment of the plurality of segments to known segment values, identifying, based on the comparison, searchable segments and one or more searchable categories for the searchable segments, independent of the order of the searchable segments within the URL, determining a search pattern based on the searchable segments and searchable segment categories, performing an inventory search based on the search pattern to identify one or more inventory items, generating web page metadata items based on the search pattern, and generating a web page comprising the web page metadata items and the list of inventory items. Examples may further enable determining the search pattern comprises ordering the known segments based on the categories, in order of highest complexity to lowest complexity. Examples may further enable creating a search request object based on the searchable segments and one or more searchable categories. Examples may further enable that the search pattern is further based on data corresponding to one or more searchable query strings from the URL, identified by comparing one or more query strings in the URL to known query string values.

Examples disclosed herein may also enable receiving a URL comprising a plurality of segments and representing a request for one or more inventory items. Examples may further enable parsing the URL into one or more segments, comparing each segment of the URL to known segment values corresponding to categorized inventory features, and identifying, based on the comparison, known segments and one or more associated categories for the known segments, independent of the order of the known segments within the URL. Examples may further enable creating a search request object based on the known segments and associated categories, and determining an inventory search pattern based on data in the search request object. Examples may further enable identifying, using the inventory search pattern, a first inventory item having at least one inventory feature associated with the inventory search pattern, generating web page metadata items using the search request object, and generating a web page comprising the web page metadata items and data associated with the first inventory item. Examples may further enable identifying known patterns of combinations of search elements, in order of highest complexity to lowest complexity. Examples may further enable that the search request object is created further based on one or more known query strings from the URL, identified by comparing one or more query strings in the URL to known query string values.

Reference will now be made in detail to embodiments of the disclosed technology, examples of which are illustrated in the accompanying drawings and disclosed herein. Wherever convenient, the same references numbers will be used throughout the drawings to refer to the same or like parts.

FIG. 1 is a block diagram of an example environment 100 including a website system 110. Environment 100 may include various components including web client device 160 connected to network 180. Web client device 160 may provide a means for a user to input and transmit a URL request to network 180. Web client device 160 may be any device capable of operating a web browser application to provide a means for a user to input and transmit a URL request to network 180. In some embodiments, web client device 160 may comprise a laptop computing device, a desktop computing device, an all-in-one computing device, a tablet computing device, a mobile phone, an electronic book reader, a network-enabled appliance such as a "Smart" television, and/or other electronic device suitable for executing a web browser application, transmitting a URL request, and retrieving web pages from network 180. In some embodiments, web browser application may be Chrome, Internet Explorer, Safari, Opera, Firefox, and/or any other software application for retrieving, presenting, and traversing information resources on a network, and include one or more means for a user to input a URL including an address bar or a displayed hyperlink.

Environment 100 may include global search engine host 170. Web client device 160 provides a means for a user to be in network communication with global search engine host 170 via network 180. Global search engine host 170 may provide a list of URLs to a user performing a search on a global search engine website using web client device 160. A user may input a URL by clicking a hyperlink to a URL displayed within a list of hyperlinks on a global search engine website displayed by web client device 160. Global search engine host 170 may be a website server for global search engine websites such as Google, Yahoo!, Bing, MSN, etc.

The various components depicted in FIG. 1 may be in network communication with one or more other components via network 180. Network 180 may comprise any infrastructure or combination of infrastructures that enable electronic communication between the components. For example, network 180 may include at least one of the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network.

Website system 110 may be in electronic communication with data storage 190 either directly as shown in FIG. 1, via network 180, or by incorporation of data storage 190 into website system 110. Data storage 190 may comprise a machine-readable storage medium. "Machine-readable storage medium" is understood to be medium such as electronic, magnetic, optical, or other physical storage device that contains or stores executable instructions, and may be non-transitory, such that it does not encompass transitory propagating signals. Data storage 190 may be implemented on a single device or distributed across devices.

Website system 110 may be in electronic communication with database 150 that includes items that are searchable and able to be displayed on a web page generated by website system 110. Database 150 may be stored on machine-readable storage medium. Website system 110 may be in communication with database 150 either directly as shown in FIG. 1, via network 180, or by incorporation of database 150 into website system 110. For example, database 150 may include lists of database items that represent tangible or intangible items. Database items may be associated with searchable features. Searchable features may be associated with search categories. Database items may represent items that are for sale or not for sale.

According to various implementations, website system 110 and the various components described herein may be implemented in hardware and/or a combination of hardware and programming that configures hardware. Furthermore, in FIG. 1 and other Figures described herein, different numbers of components or entities than depicted may be used.

According to an example embodiment, website system 110 can receive a URL request from network 180 and generate a web page for display on a user interface on web client device 160. The web page may include instructions to display a user's search intent (e.g. instructions to display database items meeting the user's search criteria) and metadata items. In some embodiments, the instructions are represented in the form of HTML or web content display code configured for sending back to web client device 160 for interpretation and display on a user interface. According to some embodiments, the metadata items may be designed according to SEO initiatives. In some examples, website system 110 may comprise URL receiving engine 120, search criteria builder engine 130, web page generator engine 150, and/or other engines. The term "engine," as used herein, refers to a combination of hardware and programming that performs a designated function.

Figure 2:
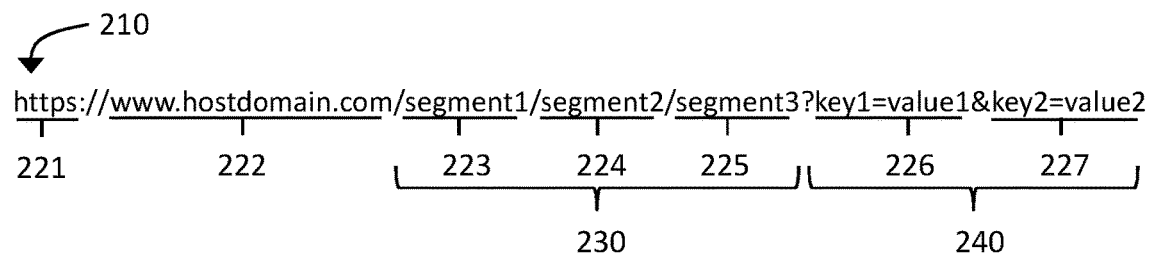
FIG. 2 illustrates an example generic URL.

URL receiving engine 120 may receive a URL request. The URL may be received from network 180 and may have originated as a user input to web client device 160. Referring to FIG. 2, an exemplary URL 210 is provided for the purposes of illustration, and is not intended to be a limiting URL structure. A URL that may be received by URL receiving engine 120 may include a scheme 221 and an authority part 222. The scheme 221 may be http, https, ftp, mailto, file, data, irc, or any URL scheme interpretable by URL receiving engine 120. The authority part 222 may include a hostname, an internet protocol address, or any URL authority part indicating that the URL is directed to the website system 110. The URL may also include a path 230 beginning with a single slash (/) and including segments 223, 224, 225, and/or a query 240 preceded by a question mark (?) including query strings 225, 226. In some embodiments, segments 223, 224, 225 and query strings 225, 226 are strings of text. Segments 223, 224, 225 are separated from other segments by a single slash (/). Query strings are separated by a query delimiter such as ampersand (&) or semicolon (;) and may have a key-value pair structure as shown in FIG. 2.

In some embodiments, search criteria builder engine 130 parses the path 230 and/or query 240 of URL 210, and determines, based on the parsing, search criteria for searching database items accessible through website system 110, for example, database items listed in database 150. A list of database items can be generated by querying database 150 based on the search criteria. The list of database items may, for example, be generated by search criteria builder engine 130 or some other engine.

Figure 3:
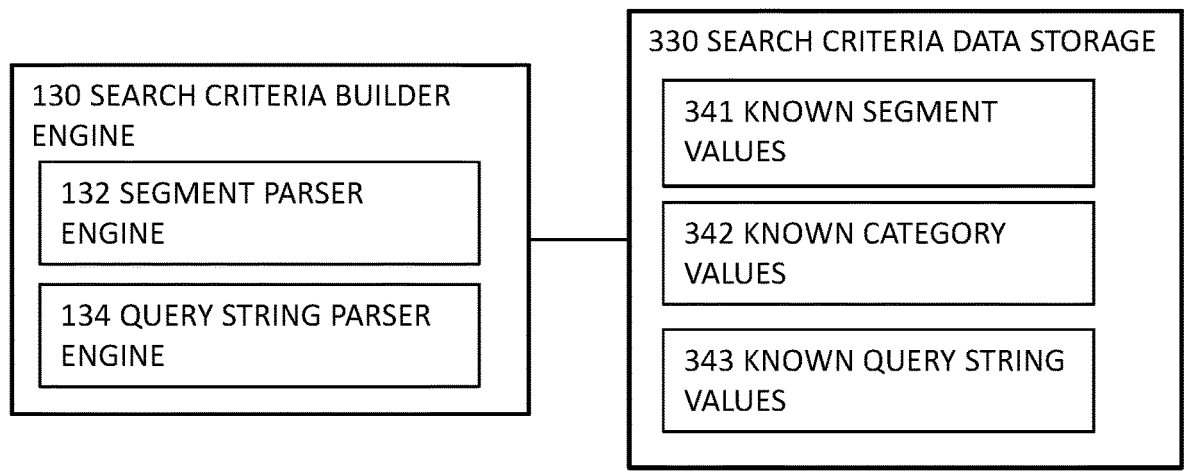
FIG. 3 is a block diagram depicting an example search criteria builder engine and an example criteria data storage.

FIG. 3 depicts search criteria builder engine 130 in further detail in accordance with some embodiments in website system 110. As shown in FIG. 3, search criteria engine 130 includes segment parser engine 132, and may also include query string parser engine 134. Search criteria builder engine 130 may be in network communication with search criteria data storage 330. In some embodiments, search criteria data storage 330 may be included as at least part of data storage 190. Search criteria data storage 330 includes a list of known segment values in known segment values store 341. Search criteria data storage 330 includes a list of known category values in known category values store 342 corresponding to the known segment values in known segment values store 341. Search criteria data storage 330 also includes known query string values in known query string values store 343.

Known segment values in store 341 may represent searchable features of items in a database, for example, database 150. Known segment values in store 341 may be values that represent searchable features of items in a database that can be compared to segment values of a URL, for example, segments 223, 224, 225. Known category values in store 342 may represent categories for categorizing searchable features of items in a database that may be used to search database inventory items. Known category values in store 342 may therefore map to groups of known segment values in store 341.

Search criteria builder engine 130 may parse segments of a received URL and determine search criteria for searching database items based on the parsing. In some embodiments, segment parser engine 132 may compare each segment of a received URL to stored known segment values in store 341 and identify which of the segments are searchable segments (meaning the searchable segment matches with a known segment value which is mapped to a searchable feature of an inventory item) and which segments are unsearchable segments (meaning the segment does not match with a known segment value and is not mapped to a searchable feature of an inventory item). Searchable segments are associated with searchable features of inventory items, and the searchable segments can be used to determine search criteria for searching items in a database. Unsearchable segments do no map to searchable features of an inventory item. In some embodiments, segment parser engine 132 identifies each segment in a received URL and stores each segment in a search object.

The searchable features of database items may also be categorized. Search criteria builder engine 130 may access stored known category values in store 342 that are associated with groups of known segment values in store 341. Known category values in store 342 may be mapped to categories of searchable inventory features. Search criteria builder engine 130 may identify searchable segments and additionally identify one or more searchable categories for each searchable segment.

Known segment values in store 341 may be associated with more than one known category value in store 342. For example, the segment value "white" may be associated with multiple category values, including "exterior color" and "interior color." For known segment values in store 341 corresponding to more than one known category value in store 342, search criteria builder engine 130 may identify one of the plurality of known category values, or more than one of the plurality of known category values for each searchable segment. In some embodiments, for searchable segments with more than one identified searchable category, search criteria builder engine 130 may prioritize the searchable category for performing a database search. As will be appreciated, multiple known category values associated with a known segment value may be handled differently depending on the characteristics of the database and the goals of the website system design.

Search criteria builder engine 130 may parse and analyze segments and query strings in the received URL independent of the order that the segments and the query strings appear in the received URL. Referring to FIG. 2, URL 210 includes a first segment 223, a second segment 224, and a third segment 225. Search criteria builder engine 130 may parse segments 223, 224, 255 independent of the order that segments appear in URL 210. The first segment 223, second segment 224, and third segment 225 could appear in any order in URL 210. For example, search criteria builder engine 130 may compare each segment 223, 224, 225 to known segment values in store 341 and identify searchable and unsearchable segments. Likewise, searchable segments may be associated with one or more searchable category values, independent of the order in which segments 223, 224, and 225 appear in URL 210.

According to some embodiments, search criteria builder engine 130 may interpret the first segment in a URL having at least one segment as being a root segment. Search criteria builder engine 130 may require that the root segment is a searchable segment corresponding to a known segment value that is mapped to a searchable inventory feature that is common to all items in the inventory.

Search criteria builder engine 130 may also parse query strings of a received URL and determine database item search criteria based on the parsing. Referring to example URL 210 depicted in FIG. 2 to illustrate the parsing, the example URL 210 may include a query 240 having a first query string 226 and a second query string 227. Referring to example search criteria builder engine 310 depicted in FIG. 3, search criteria builder engine 310 may parse the query 240, compare query strings 226, 227 to known query string values 343, and identify searchable query strings and unsearchable query strings based on the comparison. Searchable query strings may be further evaluated by examining each query string parameter and finding a builder that matches the query string. Referring to the example URL 210, query strings 226, 227 have a key-value pair structure. The first query string 226 has a key, "query1" and a value "string1". Search criteria builder engine 130 may further find a builder that matches "query1". The builder may interpret "string1" as representing a filter to apply to database items when performing a database search.

A URL may have multiple query strings in a query as shown in FIG. 2. Search criteria builder engine 130 may find a filter builder for each query string, and each filter builder may interpret the value of the query string as representing a filter to apply to database items when performing a database search. In some embodiments, search criteria builder engine 130 may ignore unsearchable query strings, such that no filter builder is used for unsearchable query strings, and no filter is to be applied to the database because of the unsearchable query string being present in the URL.

Figure 4:
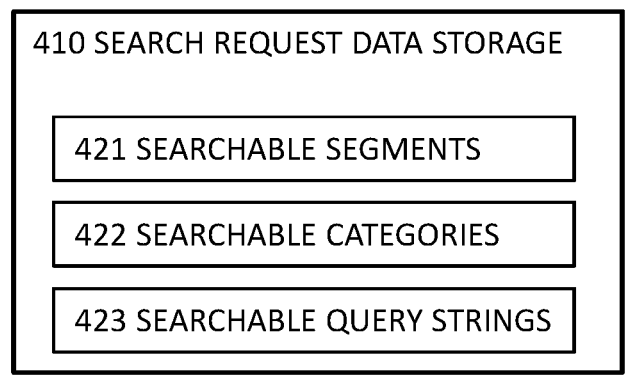
FIG. 4 is a block diagram depicting an example search request data storage.

Referring to FIG. 4, search criteria builder engine 130 may be in network communication with search request data storage 410. Search request data storage 410 may be machine-readable storage medium. Search request data storage 410 may be included as at least a portion of data storage 190. Search request data storage 410 may include data generated by search criteria builder engine 130 that may be utilized for determining search criteria for searching items in a database. In some embodiments, search request data storage 410 includes a searchable segments store 421, searchable categories store 422, and searchable query strings store 423. Unsearchable segments and unsearchable query strings may also be stored in machine-readable medium, for example in data storage 190, search request data storage 410, or elsewhere.

Search criteria for searching a database may be based at least in part on one or more searchable segments, searchable categories, or searchable query strings. In some embodiments, search criteria are stored in a search object that may include one or more values from searchable segments store 421, searchable categories store 422, and searchable query strings store 423. Search criteria builder engine 130, web page generator engine 140, or some other engine may perform a search of a database, such as database 150, and determine a list of database items that meet certain of the search criteria.

Web page generator engine 140 generates instructions for the display of a web page including the results of the search for database items on web client device 160. Web page generator 140 may generate metadata for the web page based at least in part on one or more searchable segments, searchable categories, or searchable query strings identified by search criteria builder engine 130. In some embodiments, web page generator engine 140 identifies the search pattern, stores the values from the search pattern in builder modules, and executes instructions to retrieve metadata builder routines based on the search pattern. Web page generator 140 may generate metadata for the purposes of SEO, including but not limited to: the page title, page description, canonical URL, breadcrumbs, H1 heading tag, and supplement links. Web page generator 140 may dynamically generate a web page that includes instructions for displaying the list of database items determined based on the search criteria.

In some applications, a database of items may be organized such that searchable features of database items are grouped into categories that are hierarchical. In such a scheme, a high-level category would have one or more searchable features associated with it such that searching on inventory items with a given feature in a high-level category may likely result in many database items. The search may be further narrowed by searching for a feature in a sub-category. In such an example database, sub-categories may be searched in order depending on the desired feature, resulting in ever narrower search results.

In some embodiments, search criteria builder engine 130 may identify searchable segments and associated searchable categories, and web page generator 140 may then order the searchable categories and associated searchable segments to determine a search pattern. The search pattern represents the order in which to apply search criteria when searching items in a database. For example, searchable categories and associated searchable segments may be ordered from broadest to most refined, for example, from a high-level category through subsequent sub-categories.

Metadata generated by web page generator engine 140 may also be based at least in part on the search pattern.

Figure 5:
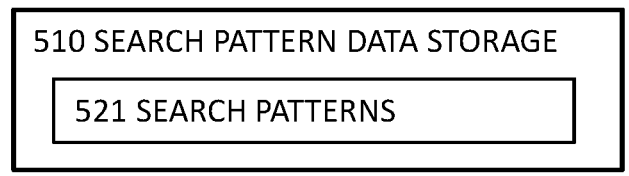
FIG. 5 is a block diagram depicting an example search pattern data storage.

Web page generator 140 may be in network communication with search pattern data storage 510 (see FIG. 5). Search pattern data storage 510 may be machine-readable medium, and may be included as at least a part of data storage 190. Search pattern data storage 510 may include a plurality of predetermined patterns representing the available order of searchable categories and searchable segments in search pattern store 521.

In some embodiments, an advantage of searching for database items based on searchable segments and searchable categories, and query strings, and independent of the order that segments or query strings appear in a received URL does not affect web page metadata or the list of database items resulting from a search of the database. Additionally, unsearchable segments in a received URL can be ignored for the purposes of a database search, which may prevent a user from being navigated to a broken link.

Figure 6:
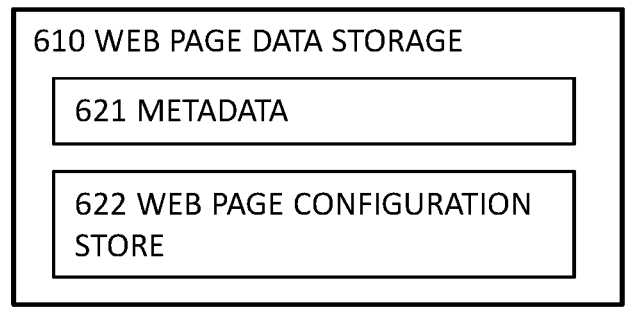
FIG. 6 is a block diagram depicting an example web page data storage.

Web page generator 140 may be in network communication with web page data storage 610 as depicted in FIG. 6. Web page data storage 610 may be machine-readable storage medium, and may be included as at least a part of data storage 190. Web page data storage 610 may include instructions for displaying a web page on a web browser on web client device 160 including metadata 621 and instructions for displaying database items in web page configuration store 622.

Figure 7:
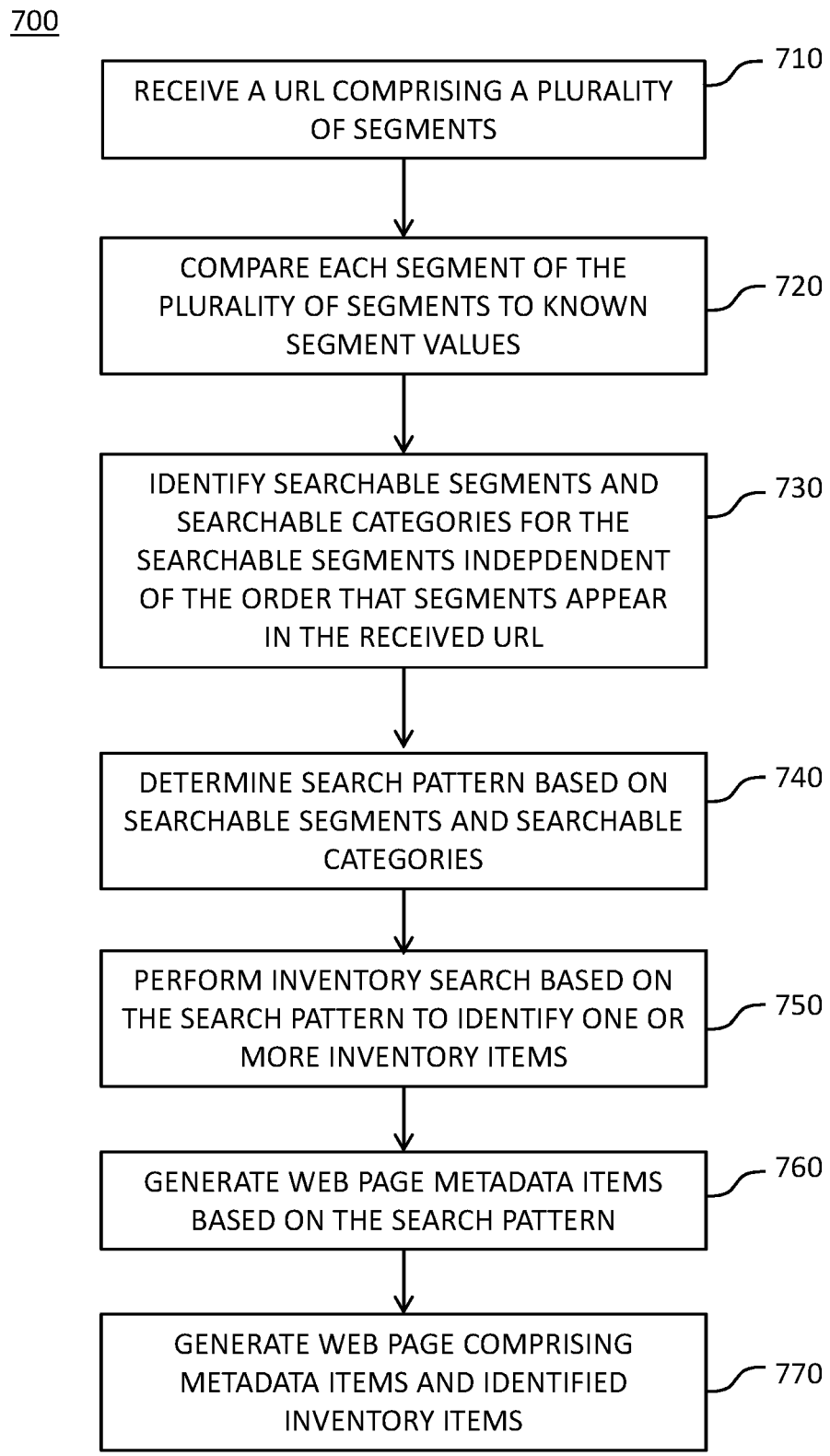
FIG. 7 is a flow diagram depicting an example method for generating a web page based on receiving a URL.

FIG. 7 is a flow diagram depicting an example method 700 for dynamically generating a web page based on a received URL. The various processing blocks and/or data flows depicted in FIG. 7 (and in other drawing figures such as FIGS. 8 and 9) are described in greater detail herein. The described processing blocks may be accomplished using some or all of the system components described in detail above and, in some implementations, various processing blocks may be performed in different sequences and various processing blocks may be omitted. Additional processing blocks may be performed along with some or all the processing blocks shown in the depicted flow diagrams. Some processing blocks may be performed simultaneously. Accordingly, method 700 as illustrated (and described in greater detail below) is meant to be an example and, as such, should not be viewed as limiting. Method 700 may be implemented in the form of executable instructions stored on a machine-readable storage medium and/or in the form of electronic circuitry.

In block 710, method 700 may include receiving a URL comprising a plurality of segments. Referring to FIG. 1, URL receiving engine 120 may be responsible for implementing block 710.

In block 720, method 700 may include comparing each segment of the plurality of segments in the URL to known segment values. Referring to FIGS. 1 and 3, search criteria builder engine 130 may be responsible for implementing block 720.

In block 730, method 700 may include identifying searchable segments and searchable categories for the searchable segments independent of the order that segments appear in the received URL. Referring to FIGS. 1 and 3, search criteria builder engine 130 may be responsible for implementing block 730.

In block 740, method 700 may include determining a search pattern based on the searchable segments and searchable categories. Referring to FIG. 1, web page generator engine 140 may be responsible for implementing block 740.

In block 750, method 700 may include performing an inventory search based on the search pattern to identify one or more inventory items. In some embodiments, search criteria builder engine 130 or web page generator engine 140 may be responsible for implementing block 750.

In block 760, method 700 may include generating web page metadata items based on the search pattern. Referring to FIG. 1, web page generator engine 140 may be responsible for implementing block 760.

In block 770, method 700 may include generating a web page comprising metadata items and identified inventory items. Referring to FIG. 1, web page generator engine 140 may be responsible for implementing block 770.

Figure 8:
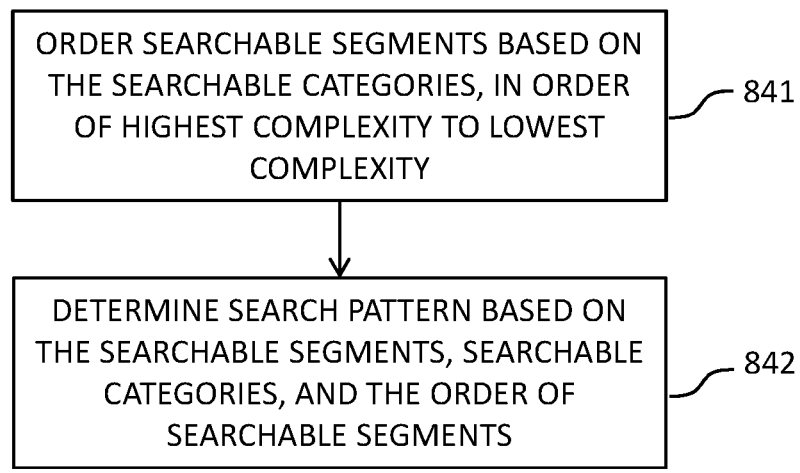
FIG. 8 is a flow diagram depicting an example method for determining a search pattern based on parsing of a URL.

In some embodiments, block 740 of method 700 may include a sub-method as shown in the flow diagram depicted in FIG. 8. In block 841, the sub-method of block 740 may include ordering searchable segments based on the searchable categories in order of highest complexity to lowest complexity.

In block 842, the sub-method of block 740 may include determining a search pattern based on the searchable segments, searchable categories, and the order of searchable segments.

Figure 9:
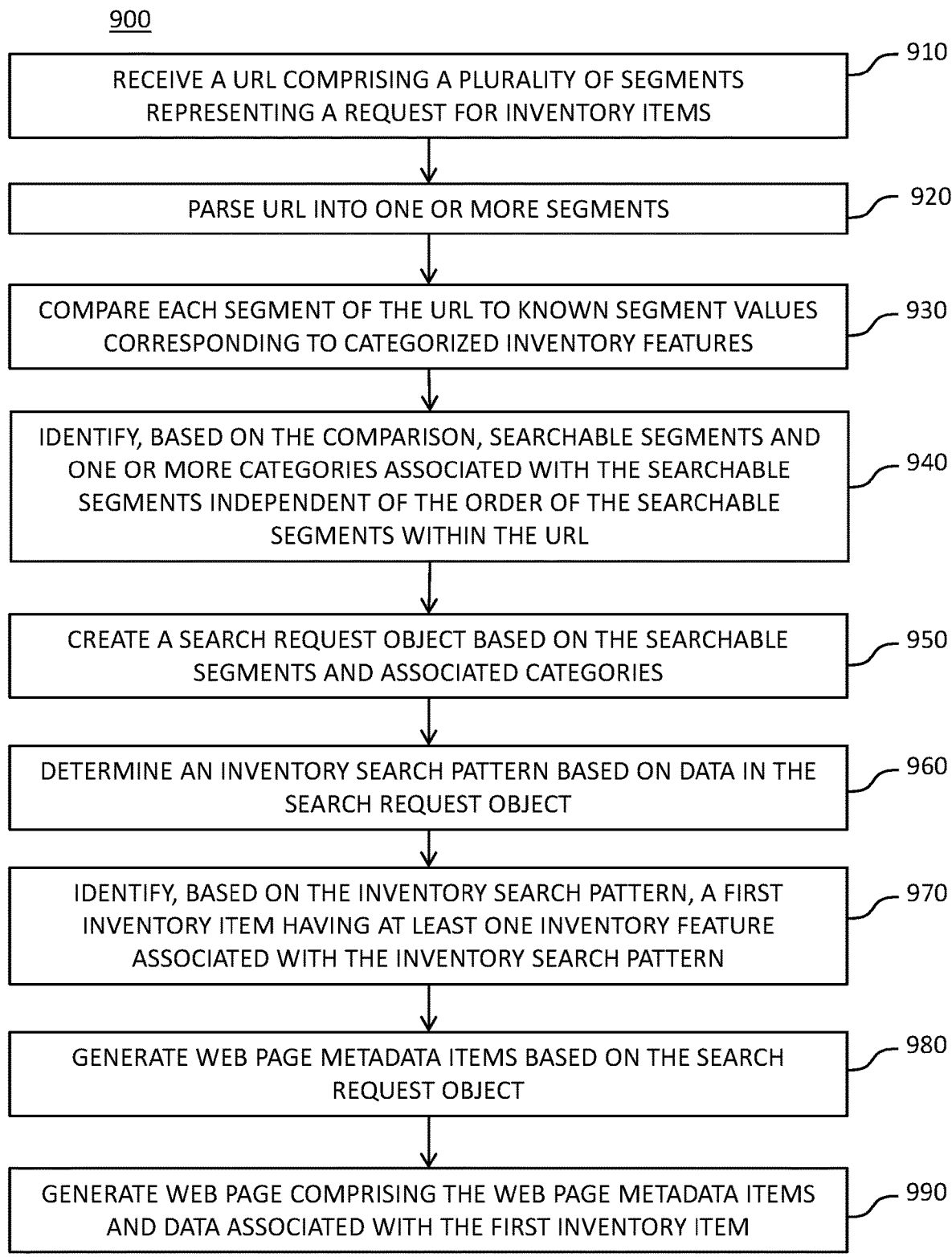
FIG. 9 is a flow diagram depicting an example method for generating a dynamic web page based on receiving a URL.

FIG. 9 is a flow diagram depicting an example method 900 for dynamically generating a web page based on a received URL. The various processing blocks and/or data flows depicted in FIG. are described in greater detail herein. The described processing blocks may be accomplished using some or all of the system components described in detail above and, in some implementations, various processing blocks may be performed in different sequences and various processing blocks may be omitted. Additional processing blocks may be performed along with some or all the processing blocks shown in the depicted flow diagrams. Some processing blocks may be performed simultaneously. Accordingly, method 900 as illustrated (and described in greater detail below) is meant to be an example and, as such, should not be viewed as limiting. Method 900 may be implemented in the form of executable instructions stored on a machine-readable storage medium and/or in the form of electronic circuitry.

In block 910, method 900 may include receiving a URL comprising a plurality of segments representing a request for inventory items. Referring to FIG. 1, URL receiving engine 120 may be responsible for implementing block 910.

In block 920, method 900 may include parsing the URL into one or more segments. Referring to FIGS. 1 and 3, search criteria builder engine 130 may be responsible for implementing block 920.

In block 930, method 900 may include comparing each segment of the URL to know segment values corresponding to categorized inventory features. Referring to FIGS. 1 and 3, search criteria builder engine 130 may be responsible for implementing block 930.

In block 940, method 900 may include identifying searchable segments and one or more categories associated with the searchable segments independent of the order of the searchable segments within the URL. Referring to FIGS. 1 and 3, search criteria builder engine 130 may be responsible for implementing block 940.

In block 950, method 900 may include creating a search request object based on the searchable segments and associated categories. Referring to FIGS. 1 and 3, search criteria builder engine 130 may be responsible for implementing block 950.

In block 960, method 900 may include determining an inventory search pattern based on the data in the search request object. Referring to FIG. 1, web page generator engine 140 may be responsible for implementing block 960.

In block 970, method 900 may include identifying, based on the inventory search pattern, a first inventory item having at least one inventory features associated with the inventory search pattern. In some embodiments, search criteria builder engine 130 or web page generator engine 140 may be responsible for implementing block 970.

In block 980, method 900 may include generating web page metadata items based on the search request object. Referring to FIG. 1, web page generator engine 140 may be responsible for implementing block 980.

In block 990, method 900 may include generating a web page comprising the web page metadata items and data associated with the first inventory item. Referring to FIG. 1, web page generator engine 140 may be responsible for implementing block 990.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

While certain embodiments of this disclosure have been described relating to what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Exemplary Use Cases

The following example implementations are intended solely for explanatory purposes and are intended to be non-limiting. The described example implementations utilize a database (e.g. database 150) that includes searchable inventory of motor vehicles. In some example implementations, a website system (e.g. website system 110) is part of a host website that provides a user at a web browser (e.g. web client device 160) an interface for searching the inventory of motor vehicles. It will be appreciated and understood that numerous other implementations are contemplated but are not described in detail herein. For example, implementations may include a database for other types of inventory items, database items need not represent tangible inventory, and database items may not be inventory (e.g. database may include searchable information).

In some example implementations, the database may include database items representing cars and trucks for sale, each car and truck having searchable features or attributes associated with categories such as "make", "model", "trim", and "exterior color." An exemplary database item may have searchable features such as "honda", "accord", and "white" associated with each respective category. Another exemplary database item may have searchable features "jeep", "wrangler", and "silver," for example. In this way, each category includes a group of associated searchable features (e.g., for category "make," "Honda" and "Toyota," and others).

Known segment values corresponding to searchable features and searchable category values corresponding to categories of searchable features may be stored on machine-readable storage medium accessible by the website system (e.g. data storage 190 or search criteria data storage 330). For example, vehicles may be searchable based on their exterior color. Exterior color in this example is a category corresponding to searchable features of vehicles, such as white, black, blue, etc. Known segment value "white" may map to inventory items having white exterior colors; in which case, "exterior color" could be a known category value associated with the known segment value "white."

Known segment values may be associated with more than one category value. For example, known segment value "white" may be associated with known category value "exterior color" and known segment value "interior color." In the case where it may be more common for a user to search for inventory based on "exterior color" rather than "interior color", a module of the website system (e.g. search criteria builder engine 130) may identify the "exterior color" as the searchable category value and ignore the "interior color" known category value. In some embodiments, search criteria builder engine 130 may identify both "exterior color" and "interior color" as searchable category values. In other examples, search criteria builder engine 130 may rank "exterior color" higher for performing a database search.

According to some embodiments, search criteria builder engine 130 may interpret the first segment in a URL having at least one segment as being a root segment. Search criteria builder engine 130 may require that the root segment is a searchable segment corresponding to a known segment value that is mapped to a searchable inventory feature that is common to all items in the inventory. For example, search criteria builder engine 130 may require that the first segment is the string "cars", and "cars" could be a searchable segment corresponding to a known segment value that is mapped to a feature common to all inventory, i.e., all inventory items are "cars".

Continuing with the example implementation, each motor vehicle may have an associated price and an associated location. The website system (e.g. website system 110) may receive a URL request including a query string "price=10000" and a query string "location=boston+ma" (e.g. at URL receiving engine 120). Website system may find filter builders for each query string (e.g. a filter builder for filtering vehicles based on the price of the vehicle in US dollars and a filter builder for filtering vehicles based on their geographical location).

In some examples, a location query string specifies a geographical location in which to perform a search for inventory and a price query string specifies a maximum price in U.S. dollars. For example, a "location" builder may interpret "boston+ma" in the location query string and build a filter for searching motor vehicles in the database of vehicle inventory. Likewise, a "price" builder may interpret "10000" and build a filter for searching vehicle inventory. In some examples, the location query string and the price query string would be identified by the website system (e.g. at search criteria builder engine 130 by the query string parser engine 134) as searchable query strings. Further, the searchable query strings may be stored in data storage (e.g. at search request data storage 410 as a searchable query string 423).

The website system may receive a URL including a query string that is not interpretable by a filter builder. For example, website system may receive a URL including a query string "price=cheap". In this example, a "price" builder may not understand the significance of "cheap". In some embodiments, the website system (e.g. at search criteria builder engine 130 by the query string parser engine 134) would identify the query string "price=cheap" as an unsearchable query string and may not utilize the string for the purposes of searching inventory. The unsearchable query string may, however, be utilized when generating web page metadata, such as functioning as a reserve word.

In other embodiments, the website system may receive a URL including a segment value that is not a query string but is associated with a filter for searching inventory items. For example, the website system may receive a URL that includes a segment of "California", and interpret this as a filter for all inventory items located in California. The website system may then build a filter for searching for motor vehicles in the database of vehicle inventory with a location of California.

The website system may parse segments and query strings of a received URL, and interpret the segments and query strings independent of the order in which the segments and query strings appear in the URL. Hence, an exemplary website system may receive a URL containing segments ordered "accord/honda/white" or a URL containing the same segments in a different order, e.g. "honda/white/accord", and in either case, the website system may identify "honda", "accord", and "white" as searchable segments corresponding to searchable category values "make", "model", and "exterior color".

Databases may be structured with a hierarchy of categories. Continuing with the example implementation, all vehicles in the database may be "cars". All cars may have a "make", for each "make" of "cars" there may be several "models", and each "model" may be further sub-divided by "exterior color". In some examples, a search pattern can be determined by examining the searchable categories and/or searchable segments. The inventory search pattern would include known segments ordered according to the search hierarchy of the database categories from broadest to most refined. The search pattern may be determined by the website system (e.g., at web page generator engine 140).

In some example implementations, the search pattern may be "checked" to ensure that when the search pattern is used to search an inventory in a database, at least one inventory item will be returned, and the inventory items which are returned most closely match the searchable segments. For example, for a search pattern that includes a specific make, model and exterior color, the search pattern may be "checked" by a comparison against a first known search pattern looking for the specific make, model, and exterior color of the vehicle. If that search returns a matching known pattern, the "check" returns "true", and the search pattern can be determined to be the specific known make-model-color. If not, the search pattern would be "checked" again by performing a search against each known search pattern, starting with more specific patterns first and then moving to broader search patterns. For example, a search may eliminate the most refined category (from the known search patterns of make-model-color to patterns for make-model), and so on, until a "check" returns "true". In some example implementations, the first "check" that returns "true" determines the inventory search pattern. If no pattern returns "true", the root segment (e.g. "cars") can be used to return a default list of inventory items.

In some embodiments, the website system may determine multiple search patterns apply to the interpreted segments and query strings of the received URL. For example, for a received URL that includes "honda/Toyota/accord", the website system would determine that "honda" and "accord" are associated with each other as "make" and "model" to form one pattern. "Toyota" is a different "make" not associated with either "honda" or "accord", and would result in its own search pattern. Thus, the inventory search may return motor vehicles that are Honda Accords and all Toyota vehicles. In such examples, the website system can interpret URLs with segment combinations that include stacked segments (e.g., "/cars/Honda/Toyota/"), mismatched combinations (e.g., "/cars/Honda/camry"), or combinations thereof (e.g., "cars/luxury/suvs/lexus/Mercedes-benz").

The search pattern may also be utilized to generated metadata for the web page, such that the metadata agrees with the list of inventory items that is determined based in part on the search pattern. Metadata may appear to a user on a web page as a page title or an H1 heading tag, for example. Unsearchable query strings and unsearchable segments may also be utilized in metadata. For example, as a "key word". This may have the advantage of including additional terms that a global search engine might recognize.

A user may access the website system via results (or links) presented to the user by a global search engine. When listings appear to a user on the global search engine website, the listings represent various pieces of metadata including a page title, a page description, and a canonical URL.

The canonical URL is a URL that is provided by the host server to a global search engine server as the URL to use to index a web page. In general, a website host may be motivated to intentionally create multiple URLs that navigate to the same web page. For example, a retailer wanting to track the effectiveness of an advertisement campaign might include adcode trackers in a URL, having a different adcode tracker depending on which website was utilized to navigate to the web page.

For example, "www.carmax.com/cars/honda/accord?adcode=cmp1+amazon" and "www.carmax.com/cars/honda/accord?adcode=cmp1+fb" may appear on Amazon.com and Facebook.com respectively, but navigate to the same web page. A link may exist elsewhere in an advertisement campaign, having the form "www.carmax.com/cars/honda/accord/great-deals/spring?adcode=cmp2+fb". However, to reduce the number of pages that are indexed by a global search engine, all pages could have an identical canonical URL "www.carmax.com/cars/honda/accord".

The exemplary systems described herein provide a number of technological advantages over existing website systems, such as the ability to update the searchable features and attributes associated with records for inventory items without having to monitor, track or police every URL deployed by the website system that may point to a particular inventory web page. For example, using the URLs above containing adcode trackers, if the URL 245 contains a "honda" segment and an "accord" segment, every received URL will result in an inventory web page having "www.carmax.com/cars/honda/accord" as the canonical URL.

The invention claimed is:

1. A computer-implemented method comprising:
   identifying searchable segments within a URL comprising a plurality of segments;
   creating a search request object based on the searchable segments;
   determining a search pattern based on the search request object;
   performing an inventory search based on the search pattern to identify one or more inventory items;
   generating at least one web page metadata item based on the search pattern; and
   generating a web page comprising the at least one web page metadata item and the one or more identified inventory items.

2. The computer-implemented method of claim 1 further comprising identifying one or more searchable categories for the searchable segments, wherein the search request object is created further based on the one or more searchable categories.

3. The computer-implemented method of claim 2, wherein determining the search pattern comprises ordering the searchable segments based on the one or more searchable categories, in order of highest complexity to lowest complexity.

4. The computer-implemented method of claim 1 further comprising identifying one or more searchable query strings within the URL, wherein the search request object is created further based on the one or more identified query strings.

5. The computer-implemented method of claim 1 further comprising generating a list of the one or more identified inventory items, wherein the generated web page further comprises the list of the identified inventory items, the method further comprising outputting a graphical representation of the generated web page for display.

6. The computer-implemented method of claim 1, wherein identifying the searchable segments further comprises: accessing known segment values in a memory store; and
   comparing the segments of the URL to the known segment values; and
   identifying the searchable segments based on the comparison.

7. The computer-implemented method of claim 1, wherein the searchable segments are identified independent of their order in the URL.

8. The computer-implemented method of claim 1, further comprising receiving the URL through:
   a user interaction with a corresponding link from a search engine result;
   a user interaction with a corresponding link from another web page; or
   a direct entry of the URL by a user.

9. The computer-implemented method of claim 1, wherein the at least one web page metadata item comprises one or more of a canonical URL, a breadcrumb, a supplemental link, an H1 tag, a title, and a page description.

10. A computer-implemented method comprising:
   creating a search request object based on a URL having a plurality of searchable segments and representing a request for one or more inventory items;
   determining an inventory search pattern based on data in the search request object;
   identifying, using the inventory search pattern, a first inventory item having at least one inventory feature associated with the inventory search pattern;
   generating at least one web page metadata item using the search request object; and
   generating a web page comprising the at least one web page metadata item and data associated with the first inventory item.

11. The computer-implemented method of claim 10, wherein identifying the first inventory item further comprises:
   accessing a search pattern data storage comprising a plurality of predetermined search patterns; and
   checking the search inventory search pattern against the plurality of predetermined search patterns to identify the first inventor item.

12. The computer-implemented method of claim 10, wherein determining the inventory search pattern based on data in the search request object comprises identifying known patterns of combinations of search elements, in order of highest complexity to lowest complexity.

13. The computer-implemented method of claim 10, wherein the search request object is created further based on one or more known query strings from the URL, identified by comparing one or more query strings in the URL to known query string values.

14. The computer-implemented method of claim 10 further comprising:
   generating instructions for displaying the web page on a web browser; and
   outputting a graphical representation of the generated web page for display.

15. The computer-implemented method of claim 10 further comprising determining a second inventory search pattern based on the data in the search request object.

16. A dynamic web page generation system comprising:
   one or more processors; and
   a memory in communication with the one or more processors and storing instructions that, when executed by the one or more processors, are configured to cause the system to:
   receive a URL comprising a plurality of segments;
   compare each segment of the plurality of segments to known segment values;
   identify, based on the comparison, searchable segments;
   generate a search request object based on the searchable segments;
   determine a search pattern based on the search request object;
   perform an inventory search based on the search pattern to identify one or more inventory items;
   generate, using a web page generator engine, a first web page metadata item based on the search pattern; and
   generate, using the web page generator engine, a first web page comprising the first web page metadata item and data associated with the one or more identified inventory items.

17. The system of claim 16, wherein the data associated with the one or more identified inventory items comprises a list of the one or more identified inventory items.

18. The system of claim 16, wherein the instructions are further configured to cause the system to:
   generate a second webpage containing interrelated metadata items shared with the first webpage; and
   provide a breadcrumb trail for navigation between the first webpage and the second webpage.

19. The system of claim 16, wherein the instructions are further configured to cause the system to:
   generate a URL based on the search request object; and
   associate the URL with the first web page.

20. The system of claim 16, wherein the instructions are further configured to cause the system to generate a multi-segment URL for the first web page, wherein:
   receiving the search criteria further comprises receiving a global search engine request comprising a user-provided first keyword; and
   a first segment of the multi-segment URL comprises the first keyword.

* * * * *